US009258073B2

(12) United States Patent
Le Pallec et al.

(10) Patent No.: US 9,258,073 B2
(45) Date of Patent: Feb. 9, 2016

(54) NETWORK ELEMENT FOR A PACKET-SWITCHED NETWORK

(75) Inventors: Michel Le Pallec, Nozay (FR); Dinh Thai Bui, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 66 days.

(21) Appl. No.: 13/993,122

(22) PCT Filed: Jan. 27, 2012

(86) PCT No.: PCT/EP2012/051337
§ 371 (c)(1),
(2), (4) Date: Jun. 11, 2013

(87) PCT Pub. No.: WO2012/107303
PCT Pub. Date: Aug. 16, 2012

(65) Prior Publication Data
US 2013/0308658 A1 Nov. 21, 2013

(30) Foreign Application Priority Data
Feb. 10, 2011 (EP) .................................... 11305138

(51) Int. Cl.
*H04J 3/06* (2006.01)
(52) U.S. Cl.
CPC ............... *H04J 3/0697* (2013.01); *H04J 3/067* (2013.01); *H04J 3/0667* (2013.01)
(58) Field of Classification Search
CPC ......... H04J 3/0667; H04J 3/0635; H04J 3/06; H04L 69/28
USPC ........................ 370/503, 216, 400, 474; 331/2
See application file for complete search history.

(56) References Cited

U.S. PATENT DOCUMENTS 6,970,045 B1 * 11/2005 Lichter et al. ..................... 331/2
7,689,854 B2  3/2010 Ilnicki et al.

(Continued)

FOREIGN PATENT DOCUMENTS

| CN | 101820355 | 9/2010 |
| CN | 101938318 | 1/2011 |

OTHER PUBLICATIONS

Magee, A.; Synchronization in Next-Generation Mobile Blackhaul Networks; IEEE Communications Magazine; IEEE Service Center, Piscataway, US; vol. 48, No. 10; Oct. 1, 2010; pp. 110-116; XP011319414; ISSN: 0163-6804.

Gerstung, H.; Synchronizing PTPv1 and PVPv2 Clients with One Common Time Source; Precision Clock Synchronization for Measurement, Control and Communication, 2008; ISPCS 2008; IEEE International Symposium on, IEEE, Piscataway, NJ, USA; Sep. 22, 2008; pp. 1-6; XP031354113; ISBN: 978-1-4244-2274-6.

(Continued)

*Primary Examiner* — Jeffrey M Rutkowski
*Assistant Examiner* — Ning Li
(74) *Attorney, Agent, or Firm* — Pat ti & Malvone Law Group, LLC

(57) ABSTRACT

A network element for a packet-switched network has a plurality of network ports for exchanging synchronization messages with further network elements, a local clock, a timestamp generation module associated to each network port for triggering generation of a timestamp, and a synchronization control module selectively configurable in a first operating mode and a second operating mode as a function of a configuration signal. When the synchronization control module is configured in the first operating mode, it is adapted to adjust an offset of the local clock as a function of the timestamps of the synchronization messages received through the slave port. When the synchronization control module is configured in the second operating mode, it is adapted to compute a residence time of a synchronization message in the network element as a function of the timestamps obtained at the time of receiving and sending the synchronization message.

14 Claims, 3 Drawing Sheets

(56) References Cited

U.S. PATENT DOCUMENTS

2010/0118895 A1* 5/2010 Radulescu .................... 370/503
2010/0238794 A1* 9/2010 Kanthamneni et al. ....... 370/217
2011/0161701 A1* 6/2011 Blixt et al. .................... 713/320
2011/0200051 A1* 8/2011 Rivaud et al. ................. 370/400
2012/0128011 A1* 5/2012 Holmeide et al. ............ 370/474

OTHER PUBLICATIONS

Ruffini, S.; Time and Phase Sync Noise Budget in G.8271; ITU-T Drafts; Study Period 2009-2012; International Telecommunication Union; Geneva; CH; vol. Study Group 15; 13; Oct. 5, 2010; pp. 1-4; XP017448512.

* cited by examiner

NETWORK ELEMENT FOR A PACKET-SWITCHED NETWORK

CROSS REFERENCE

This application claims the benefit of European patent application No. EP 11305138.7, filed Feb. 10, 2011 and the benefit of PCT patent application No. PCT/EP2012/051337, filed Jan. 27, 2012, the respective contents of which are hereby incorporated by reference in their entirety.

FIELD OF THE INVENTION

The invention relates to the technical field of clock synchronization within packet-switched networks.

BACKGROUND

For various applications with demanding synchronization constraints, for example the synchronization of base stations of a mobile network, methods for the distribution of a reference time and/or a reference frequency on the packet-switching networks are being developed. For example, a Network Time Protocol (NTP) work group of the IETF is developing an upgrade to the NTP protocol initially specified in RFC 1305. The Precision Time Protocol (PTP) of the IEEE has been revised with this in mind. The ITU-T has defined a physical layer technology for the distribution of a reference frequency on an Ethernet network, called Synchronous Ethernet and described in the specifications G.8261, G.8262 and G.8264.5.

The IEEE 1588V2 protocol or Precision Time Protocol release 2 (PTPV2) is being studied for supporting the distribution of time and frequency in the context of stringent applications such as mobile networks. Accuracy requirements in wireless networks are about 50 ppb for frequency and about one microsecond for time. In the context of Packet-Switched Networks (PSNs) and Time distribution, the performance of the IEEE 1588V2 protocol is mainly limited by the packet jitter and the communication path delay asymmetry, both often referred to as "network noise". The former is related to Packet Delay Variations (PDVs). The latter is the result of the difference between the communication delay of one PTPV2 message in one direction (e.g. from Master to Slave) as compared to the delay of a related PTPV2 message with the same sequence number in the opposite direction (e.g. from Slave to Master).

PTPV2 performance is very dependent on the PSN background traffic level, which is unpredictable. In order to remove/control these dependencies, Transparent Clock (TC) and Boundary Clocks—(BC) hardware support have been introduced in the PTPV2 standard.

In "Time and phase Sync noise budget in G.8271", Stefano Ruffini, ITU-Drafts, 2010, every node of a network has a Boundary Clock and/or a Transparent Clock.

"Synchronization in next-generation mobile backhaul networks" by A. Magee, IEEE Communications magazine vol. 48, no. 10, 2010 describes a network comprising a grandmaster clock, intermediate nodes in which are placed boundary and transparent clocks and ordinary clocks. It is recommended that all intermediate nodes can work in either a boundary clock or transparent clock to overcome the effects of packet delay variation.

"Synchronizing PTPv1 and PVPv2 clients with one common time source" by H. Gerstung, International IEEE Symposium on Precision clock Synchronization for Measurement, Control and Communication, 2008 describes a Hirschmann MICE-20 Industrial Ethernet Switch which comprises two units: one in boundary clock mode with two IEEE 1588-2002 modules and one with two IEEE 1588-2008 modules which can be configured to operate in boundary clock mode or 1-step and 2-step transparent clock mode.

SUMMARY

In an embodiment, the invention provides a network element for a packet-switched network comprising:
a plurality of network ports for exchanging synchronization messages with further network elements,
a local clock,
a timestamp generation module associated to each network port for triggering generation of a timestamp by the local clock at the time of sending or receiving a synchronization message through the network port, and
a synchronization control module selectively configurable in a first operating mode and a second operating mode as a function of a configuration signal, wherein the synchronization control module configured in the first operating mode is adapted to
select a first network port as a slave port and a second network port as a master port,
adjust an offset of the local clock as a function of the timestamps of the synchronization messages received through the slave port, and
send synchronization messages including timestamps obtained with the adjusted local clock through the master port;
and wherein the synchronization control module configured in the second operating mode is adapted to
forward a synchronization message received through the first network port to the second network port,
send the synchronization message through the second network port, and
compute a residence time of the synchronization message in the network element as a function of the timestamps obtained at the time of receiving and sending the synchronization message.

According to embodiments, such network elements can comprise one or more of the features below.

In an embodiment, the network element further comprises a management interface for receiving the configuration signal from a network manager.

In an embodiment, the network element further comprises a detection module for detecting the configuration signal as a signaling object within a synchronization message.

In an embodiment, the synchronization control module processes a synchronization message in accordance with the first operating mode or the second operating mode as a function of the signaling object included in the synchronization message.

In an embodiment, the network element has an interface for receiving the configuration signal from a Grand Master clock in a PTPV2 management message.

In an embodiment, the configuration signal comprises a Boolean parameter taking a first value for configuring the clock control module in the first operating mode and a second value for configuring the clock control module in the second operating mode.

In an embodiment, the local clock comprises:
a local oscillator,
a first counter incremented by the local oscillator and adapted to be adjusted by the synchronization control module in the first operating mode, and a second counter incremented by the local oscillator.

In an embodiment, the synchronization control module in the second operating mode is adapted to compute the residence time of a synchronization message as a function of the second counter at the times of receiving and sending the synchronization message.

In an embodiment, the network element further comprises: a second local clock and
a second synchronization control module selectively configurable in the first operating mode or the second operating mode as a function of a second configuration signal.

In an embodiment, the first synchronization control module is configured in the first operating mode and the second synchronization control module is configured in the second operating mode.

In an embodiment, the network element further comprises a protection module adapted to:
detect a fault condition of the first synchronization control module configured in the first operating mode and
configure the second synchronization control module in the first operating mode in response to the fault detection to resume adjusting the offset of the second local clock.

In an embodiment, the network element further comprises an application interface for passing timestamps generated by the second local clock to an application adapted to estimate an end-to-end latency experienced by a packet flow.

In an embodiment, the synchronization messages are exchanged in accordance with an IETF Network Time Protocol or an IEEE Precision Time Protocol.

In an embodiment, the network element further comprises a physical layer module associated to a network port and adapted to synchronize the local clock with a synchronous physical layer signal received at the network port.

In an embodiment, the physical layer signal is generated in accordance with a Synchronous Ethernet standard.

Aspects of the invention are based on the idea of providing a network element offering flexible operations for the distribution of time in packet-switched networks.

Aspects of the invention are based on the idea of implementing a configurable device that can operate either as a PTPV2 boundary clock or a PTPV2 transparent clock.

Aspects of the invention stem for the observation that PTPV2 TCs and PTPV2 BCs demonstrate some strong similarities and accordingly can be implemented with some shared hardware and/or software to reduce a cost of implementation. It is especially observed that both PTPV2 equipments feature hardware-assist time stamping at the port level, generation of Event messages such as SYNC, DELAY_REQ and others at the port level, and time synchronization of PTPV2 ports.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Methods and devices for distributing a time reference and a frequency reference in a packet-switched network will now be described in the context of a PTPV2 protocol. The invention is not limited to that specific context and can be used with other synchronization protocols having similar features.

Figure 1:
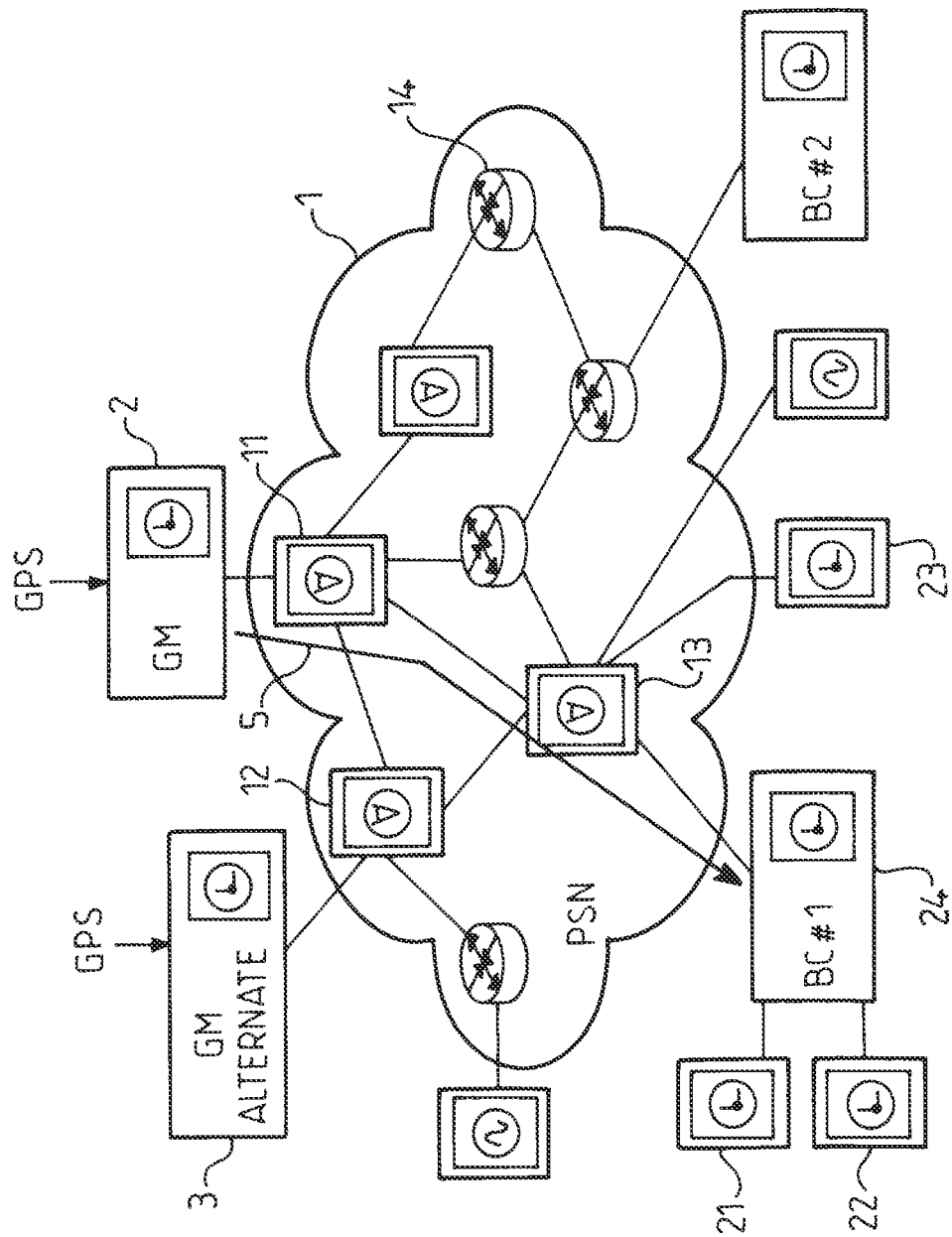
FIG. 1 is a functional representation of a packet-switched network in which a time reference is distributed to network elements through transparent clocks and boundary clocks made in accordance with PTPV2.

With reference to FIG. 1, a packet-switched network 1 comprises network elements connected by links. The network elements may comprise IP routers, Ethernet switches or others depending on a protocol stack used in the network 1. A Grand Master (GM) clock 2 connected to network element 11 serves to generate a time reference to be distributed to a plurality of clocks arranged in further network elements 21, 22, 23, 24 connected to the network 1. The GM clock 2 is synchronized to a highly stable source such as a Global Positioning System or other. An alternate GM clock 3 is provided for redundancy and fault protection.

In the network 1, the synchronization path between the GM clock 2 and the boundary clock 24 is shown by arrow 5. As shown, some network elements of network 1, such as network elements 11 and 13, are equipped with a local clock serving as a transparent clock whereas other network elements such as network element 14 are not equipped with a PTPV2 local clock.

The operations of a transparent clock in the PTPV2 standard will now be briefly recalled. Two types of transparent clocks have been defined as End-to-end Transparent Clocks (E2E TC) and Peer-to-peer Transparent Clocks (P2P TC). An end-to-end transparent clock aims at measuring and correcting the transit delay or residence time of the network element equipped with the E2E TC. A peer-to-peer transparent clock (P2P TC) aims at measuring and correcting both a link delay and the residence time within the network element. For links demonstrating constant packet delays, the whole link delay can be provisioned at the slave clock or master clock level, so that E2E TCs may be sufficient.

An E2E TC measures locally the residence time experienced by an event message (e.g. a SYNC message) within the associated network element and adds it cumulatively to the "correction field" of the event message. In brief, transparent clocks are able to measure the delay experienced by PTPV2 packets while traversing network elements.

The operations of a boundary clock in the PTPV2 standard will now be briefly recalled.

Boundary clocks enable to segment a large synchronization network into small areas where PDVs can be engineered and/or controlled within specified bounds. A BC serves as a means to recover the reference time or frequency as accurately as possible before distributing the same into a next area of the synchronization hierarchy.

Boundary clocks are defined within a PTP system to sit in place of standard network switches or routers. Boundary clocks are defined as PTP clocks with more than a single PTP port, with each port providing access to a separate PTP communication path. The boundary clock acts as an interface between separate PTP domains intercepting and processing all PTP messages and passing all other network traffic. The BMC algorithm is used by the boundary clock to select the best clock any port can see. The chosen port is set as a slave and all other ports of the boundary clock are asserted as masters to their domain.

The main functions of a boundary clock include:
delineating the PTP domains by intercepting PTP messages,
providing regeneration points to limit latency fluctuations typically generated by routers and similar devices,
distributing time in a point to multipoint mode, and
ensuring the synchronization of PTPV2 clocks across heterogeneous networks, e.g. by providing adaptation functions between protocols relying on different network layers.

As used in the network 1 of FIG. 1, the boundary clock 24 has a slave port connected to network element 13 and two master ports connected to network elements 21 and 22 which include e.g. ordinary clocks. Thus, BC 24 terminates a first PTP flow from GM clock 2 to synchronize with it and generates a second PTP flow towards ordinary clocks 21 and 22 to distribute the same time reference.

Figure 2:
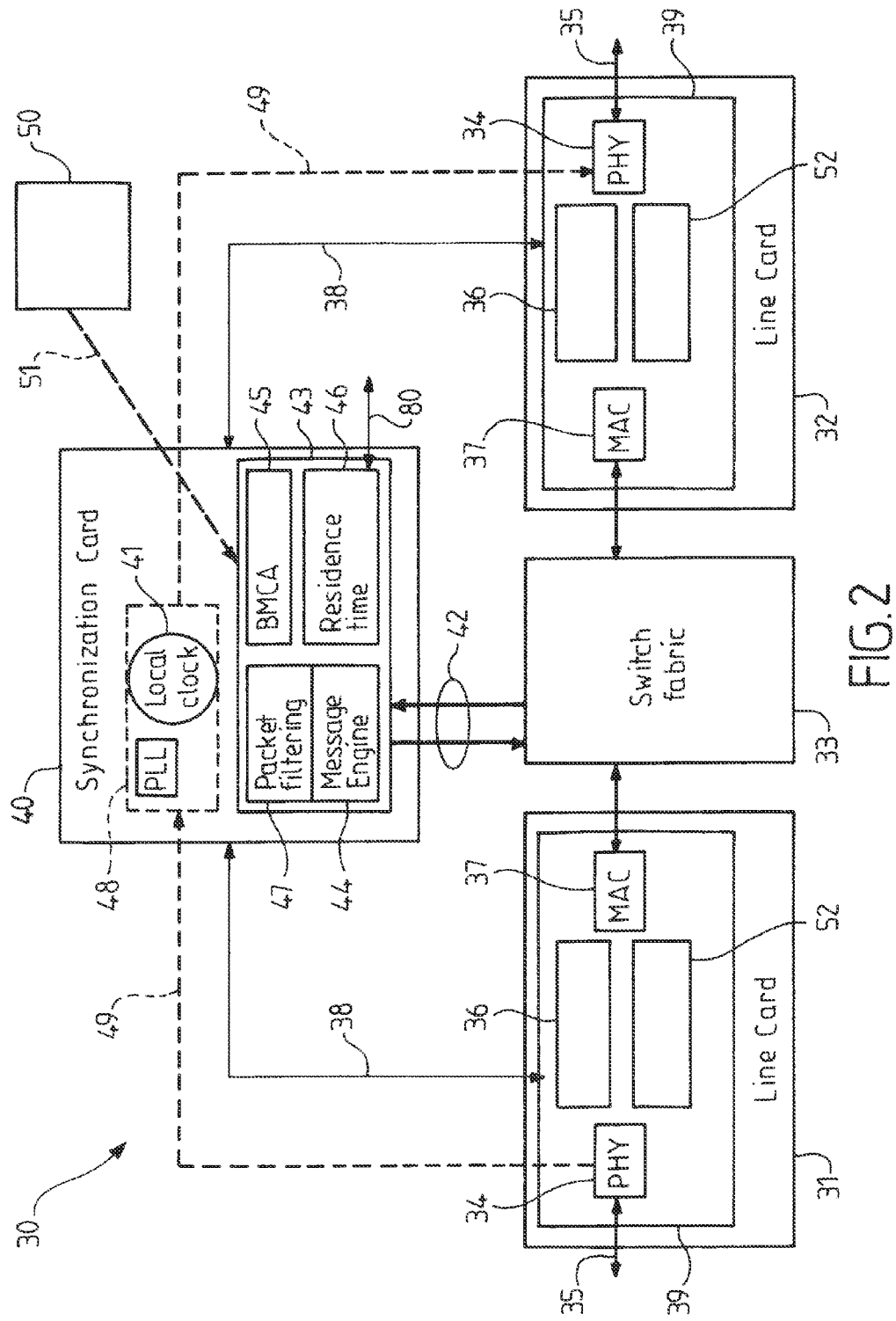
FIG. 2 is a functional representation of a network element which can be used in the network of FIG. 1.

With reference to FIG. 2, there will now be described an embodiment of a network element 30 adapted to operate either as an E2E TC or as a BC as a function of a configuration. Network element 30 can be used in network 1 to implement both the illustrated TCs and BCs.

The configurable network element 30 schematically represented in FIG. 2 comprises a plurality of line cards 31, 32 implementing the network ports 39, a switch fabric 33, e.g. an Ethernet switch, interconnecting the line cards 31, 32 to transfer packet traffic between the network ports and a synchronization card 40 including a local clock 41.

The network ports can be provided in any number. Only two line cards 31 and 32 are shown in the embodiment of FIG. 2 for the sake of simplicity. The line cards 31 and 32 as shown are bidirectional. Unidirectional line cards could be arranged in the same manner.

In each of the line cards 31 and 32, a physical layer module 34 is adapted to send and receive signals in accordance with the features of the physical layer implemented in the corresponding bidirectional links 35, e.g. optical or electrical links. A timestamp capture module 36 cooperates with the synchronization card 40 as shown by arrows 38 to measure the local time at the very instant when a PTP message is sent or received through the network port 39, in a manner known in the art. A MAC module 37 is adapted to process data frames in accordance with the features of the link layer implemented in the network, e.g. Ethernet.

The switch fabric 33 transfers ordinary traffic between the network ports 39 as a function of addressing information comprised in the packets, as known in the art of packet-switched networks. Packets identified as PTPV2 messages are passed to the synchronization card 40 to be processed in accordance with the PTPV2 protocol, as shown by arrows 42.

The synchronization card 40 comprises a synchronization control module 43 which implements the main functions provided in the PTPV2 protocol. The synchronization control module 43 and its functional modules can be implemented by a processor programmed with PTPV2 software stored in a memory module. The functional modules include a message engine 44 adapted to generate and decode all types of messages provided in the PTPV2, e.g. SYNC, FOLLOW_UP, DELAY_REQ, DELAY_RESP, etc. A BMCA module 45 implements a Best Master Clock Algorithm to select the state of ports as a function of clock data sets in a known manner. The BMCA module 45 also generates a data set to announce the local clock properties within the PTP domain. A residence time computation module 46 serves to compute the residence time of packets within the network element 30 when transparent clock processing performed. A packet filtering module 47 serves to process the time stamps of PTP messages received through the slave port to adjust the offset of the local clock 41 when boundary clock processing performed.

Optionally, a synchronizing module 48 may be provided to lock in the local clock 41 with an external frequency reference source using a synchronous physical layer, e.g. Synchronous Ethernet, as shown by arrows 49.

In an embodiment, the synchronization control module 43 operates differently as a function of a configuration state, to provide either the functions of a PTPV2 boundary clock or the functions of a PTPV2 transparent clock. The operations of the synchronization control module 43 will now be briefly described for each configuration state in the context of processing PTP flows for which line card 31 provides an input port and line card 32 provides an output port. Modules 45 and 47 can remain inactive in the TC mode. Module 46 can remain inactive in the BC mode.

In a TC operating mode, the synchronization control module 43 performs essentially the following operations upon receiving a PTP event message through the input port:
capturing the message reception time measured by local clock 41,
capturing the message transmission time measured by local clock 41,
computing the message resident time as a difference between the transmission time and the reception time,
Modifying the PTP message header to update the correction Field.

In a BC operating mode, the synchronization control module 43 performs essentially the following operations upon receiving a PTP event message through the slave port:
capturing the message reception time measured by local clock 41,
processing the time stamps contained in the message to update an offset estimation of the local clock with respect to the master clock,
if the offset estimation satisfies an adjustment condition, adjusting the local clock as a function of the newly estimated offset,
generating outgoing PTPV2 messages to be sent through the master port(s),
capturing the transmission time of outgoing PTPV2 messages and writing the transmission time within the PTPV2 origin Timestamp in the PTP message payload.

In brief, residence time information is written in the outgoing PTPV2 message header in the TC operating mode whereas transmission time information is written in the outgoing PTPV2 message payload in the BC operating mode.

Two different types of timestamping methods, either one step or two-step can be used in each operating mode. One-step clocks update time information within event messages (SYNC and DELAY-REQUEST) on-the-fly, while two-step clocks convey the precise timestamps of packets in general messages (follow-up and delay-response). A one-step end-to-end transparent clock updates the residence time in sync and delay-request messages as they pass through the network element while a two-step transparent clock updates a field in the non time-critical general message. There are stronger hardware constraints for the one-step method.

There will now be described methods for configuring the synchronization card 40 to operate in an operating mode selected among the BC mode and the TC mode.

In a first embodiment, adapted to establish configuration states in a static or weakly dynamic way, a network management plane can be used to configure the synchronization card 40. In such a case, the synchronization card 40 comprises a management interface symbolized by arrow 51 to receive a configuration signal from a management station 50, e.g. a synchronization manager or a network manager of the network. The Simple network management protocol (SNMP) can serve as the communication protocol between the management station 50 and network element 30 using specific objects. In an embodiment, the configuration signal can be implemented as a Boolean parameter PTP_Clock_Config having a predefined meaning such as, e.g.

PTP_Clock_Config=1 causes the synchronization card 40 to operate in the BC mode PTP_Clock_Config=0 causes the synchronization card 40 to operate in the TC mode.

In further embodiments adapted to establish configuration states in a more dynamic way, the synchronization card 40 is configured by a control plane of the packet-switched network. Several options exist in this respect.

In a second embodiment, the TC mode/BC mode selection is done by means of PTPV2 signaling. To that end, the line cards 31 and 32 can be equipped with a clock mode capture module 52 adapted to identify a predefined configuration signal within a PTPV2 message and trigger configuration of the synchronization card 40 accordingly. SYNC or ANNOUNCE messages can serve to carry the configuration signal.

To serve as a corresponding configuration signal, a specific PTPV2 field following the TLV (Type Length Value field) semantics can be provided. The aim of such a TLV is to carry the configuration parameter required for setting the operating mode of the synchronization card 40, for example the Boolean parameter described above.

In this second embodiment, care has to be taken that the signaling message carry the configuration signal can actually reach the network element it is intended to configure. Especially, if an intermediate BC stands between the source of the PTP signaling message, e.g. the GM clock 2 and the configurable network element 30, the PTPV2 signaling is normally terminated at the intermediate BC before reaching the targeted node. In an embodiment, this issue is solved by programming the BCs to detect a received configuration signal for a particular node and repeat that configuration signal in new PTPV2 messages originated by the BC down to the targeted node. This embodiment requires that the network address of the targeted node is attached to the configuration signal, e.g. within the above described TLV field. As an extension, a TLV field may be comprise a concatenation of multiple network addresses and corresponding configuration signals in order to trigger an operating mode switching in multiple nodes with a minimum number of PTPV2 messages. In an alternative embodiment, the use of PTPV2 management messages sent for instance by the GrandMaster clock 2 solves the end to end signaling issue as these messages are not terminated by BCs.

In a third embodiment, other messages of an IP control plane are used for carrying the clock configuration information e.g. a TraceRoute command or RSVP signaling. This embodiment relies on an interworking function between the network control plane and the PTPV2 plane so that PTPV2 configurable clocks receive the clock configuration information. Such information can be inserted in TLV extensions in a similar manner to the second embodiment.

In all three configuration methods, the configurable network element 30 able to operate either as a BC or as a TC can be configured flexibly in accordance with the desires of a network operator in terms of synchronization and services.

For the distribution of time by the IEEE1588V2 protocol or similar protocols, the above-described configurable network element 30 capable of operating as a BC or a TC as a function of a configuration signal provides advantages such as universality and ease of deployment for network operators. It allows for a flexible configuration of the PTPV2 support in the network, while keeping the strength of both BC support and TC support in a flexible way.

Compared to implementations of TCs and BCs as different devices, the configurable network element also makes it possible to reduce an inventory of components and spare components.

Figure 3:
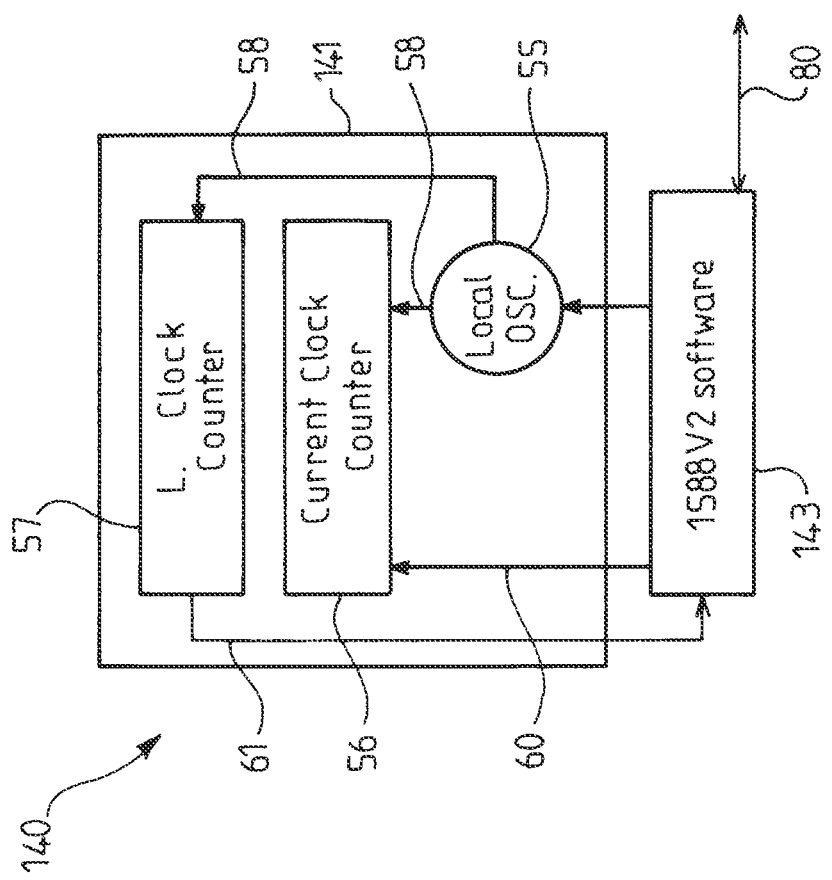
FIG. 3 is a functional representation of an embodiment of a local clock which can be used in the network element of FIG. 2.

Turning to FIG. 3, there will now be described another embodiment of the synchronization card. Elements identical or similar to those of FIG. 2 are referenced with the same numeral increased by 100.

In the synchronization card 140, the local clock 141 comprises a local oscillator 55 and two counters 56 and 57. The counters 56 and 57 are incremented by the local oscillator 55 as shown by arrows 58, so that they progress at the same rate. However, they may be mutually offset, i.e. have different absolute values.

For TC operations, the absolute value of counter 56 or 57 does not matter since TC operations only require computing the duration between a time of reception and a time of transmission. The counters 56 and 57 are intended to improve BC operations of the synchronization card. Namely, the counter 56 contains the current local clock value that is continuously adjusted by the synchronization control module 143 to keep synchronized with the reference time distributed by the master clock emitting the PTP flow received at the slave port of the network element. The counter 57 is intended to compute the residence time of PTP packets, in particular over a period of time during which the offset of counter 56 may be corrected or adjusted. For that purpose, counter 57 is incremented in a linear manner at all times, by only following the progression of time provided by the oscillator.

As mentioned, the BC operations involve adjusting the local clock offset when the offset estimation satisfies an adjustment condition. Actually, the adjustment condition involves averaging the offset estimation over a large number of PTP event messages, so that statistical fluctuations of network conditions do not result in chaotic adjustments of the local clock. As a consequence, it is generally observed that the filtering window of the offset adjustment algorithm is much larger than the typical packet residence time.

The current clock counter 56 serves to perform the BC operations of the synchronization card 140. Concurrently, the current clock counter 56 also serves to timestamp the reception and transmission of PTP packets belonging to the client flow associated to the BC. BC operations also include the frequency adjustment of the local oscillator 55. However, linear clock counter 57 is used instead of current clock counter 56 to timestamp the reception and transmission of PTP packets intended for TC operations and compute a residence time of such packets. Namely, timestamping the PTP packet with the linear clock counter 57 makes it possible to accurately compute the residence time of the packet unaffected by the nonlinear evolution of counter 56.

It will be appreciated that this embodiment makes it possible for the synchronization card 140 to provide BC operations and TC operations simultaneously with a single local oscillator 55. Therefore, a more dynamical configuration of the synchronization card 140 is made possible, e.g. on a packet by packet basis.

In a corresponding embodiment, the synchronization card 140 identifies PTP packets tagged with a "TC treatment flag" and PTP packets tagged with a "BC treatment flag" and processes each packet in accordance with the intended behavior, either to update an offset estimate of the local clock 141 or to compute a residence time of the PTP packet using the counters 56 and 57 as the case may be. Again, such flags can be provided as a Boolean parameter in a TLV object.

Computing the residence time of packets tagged with a "TC treatment flag" can serve to provide further functionality, such as estimating the end-to-end latency experienced by a given application flow, as indicated by arrow 80. This feature particularly allows for efficiently driving the transport network and/or efficiently configuring the application flows so that application requirements in terms of latency are met, e.g. for real-time services such as video conferencing, interactive games, voice over IP, and others. In such a context, TC operations serve to provide accurate latency probes within the packet-switched network.

In brief, with the embodiment of FIG. 3, it is possible to only deploy boundary clocks in the network e.g. one BC per node, namely configurable network elements configured in the BC operating mode. Yet, such a BC-only deployment also provides a capability to drive time-critical application transport, thanks to the combined TC operations adapted to measure the transit delays. This feature enables an operator to address efficiently the requirements in terms of latency of real-time applications and services while avoiding the deployment of stand-alone transparent clocks.

In a modified embodiment, the two counters 56 and 57 serve to implement two parallel Boundary Clocks driven by the same local oscillator 55. Namely, each BC is locked in with the reference time of a respective GM clock by means of a respective PTP client flow associated to each BC.

Figure 4:
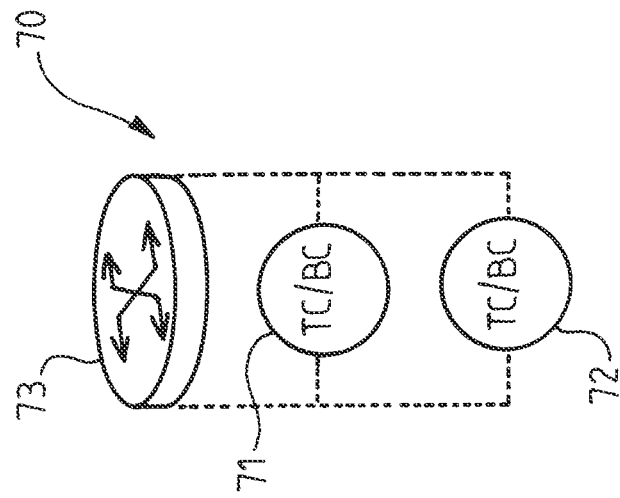
FIG. 4 is a functional representation of a network element in accordance with another embodiment.

In embodiments, a network element is equipped with a single synchronization card 40 or 140. By contrast, FIG. 4 illustrates an embodiment of a network element 70 equipped with two configurable synchronization cards 71 and 72 cooperating with a shared switching fabric 73, e.g. an IP router. The synchronization cards 71 and 72 offer configurable operations between a TC operating mode and a BC operating mode as above.

In an embodiment, both synchronization cards 71 and 72 are configured identically so that one of them serves as a working component and the other serves as a back-up component able to immediately take over operations in case of a fault of the working component. This embodiment enhances local protection through redundancy.

In another embodiment, while the working component e.g. synchronization card 71 is operated in the BC mode, the back-up component e.g. synchronization card 72 is in a TC mode to serve as a delay probe. Namely, while the back-up synchronization card 72 is not used for the BC function, it is configured in a TC mode in order to capture transit delays that can be used in order to efficiently address real-time application requirements. As soon as a fault occurs in the synchronization card 71, the synchronization card 72 is reconfigured in the BC mode to take over operations. This embodiment allows for an optimized use of a backup synchronization card.

In the embodiment of FIG. 4, the configuration of the network element can be controlled with signaling messages carrying two configuration parameters, i.e. one for each synchronization card. These configuration parameters could be Boolean parameters as mentioned above.

Some of the elements shown, particularly the various modules, may be constructed in various forms, in a stand-alone or distributed fashion, using hardware and/or software components. Hardware components that may be used are application-specific integrated circuits, field-programmable gate arrays, or microprocessors. Software components may be written in various programming languages, such as C, C++, Java, or VHDL. This list is not exhaustive. Elements referred to as cards are only intended to illustrate one possible implementation of the modules. The distribution of electronic functions over one or more physical cards can be done in a variety of manners.

A network management system may be a hardware device, such as a microcomputer, a workstation, a device connected to the Internet, or any other dedicated or general-purpose communication device. Software programs run by this system fulfill network management functions for controlling network elements.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A network element for a packet-switched network comprising:
  a plurality of network ports for exchanging synchronization messages with further network elements;
  a local clock;
  a timestamp generation module associated to each network port for triggering generation of a timestamp by the local clock at the time of sending or receiving a synchronization message through the network port; and
  a first synchronization control module selectively configured in a first operating mode and a second operating mode;
  wherein when the first synchronization control module is configured in the first operating mode, it operates to:
    select a first network port as a slave port and a second network port as a master port,
    adjust an offset of the local clock as a function of timestamps of the synchronization messages received through the slave port; and
    send synchronization messages including timestamps obtained with the adjusted local clock through the master port;
  and wherein when the first synchronization control module is configured in the second operating mode, it operates to:
    forward the synchronization message received through the first network port to the second network port;
    send the synchronization message through the second network port; and
    compute a residence time of the synchronization message in the network element as a function of the timestamps obtained at the times of receiving and sending the synchronization message,
  characterized in that the first synchronization control module is selectively configured in the first operating mode and the second operating mode as a function of a configuration signal;
  wherein the network element further comprises a detection module for detecting the configuration signal as a signaling object within the synchronization message and wherein the first synchronization control module processes the synchronization message in accordance with the first operating mode or the second operating mode as a function of the signaling object included in the synchronization message.

2. The network element in accordance with claim 1, further comprising a management interface for receiving the configuration signal from a network manager.

3. The network element in accordance with claim 1, wherein the configuration signal comprises a Boolean parameter taking a first value for configuring the clock control module in the first operating mode and a second value for configuring the clock control module in the second operating mode.

4. The network element in accordance with claim 1, wherein the local clock comprises:
  a local oscillator;
  a first counter incremented by the local oscillator and configured to be adjusted by the first synchronization control module in the first operating mode; and
  a second counter incremented by the local oscillator.

5. The network element in accordance with claim 4, wherein the first synchronization control module in the second operating mode is configured to compute the residence time of the synchronization message as a function of the second counter at the times of receiving and sending the synchronization message.

6. The network element in accordance with claim 1, further comprising:
  a second local clock; and
  a second synchronization control module selectively configured in the first operating mode and the second operating mode as a function of a second configuration signal.

7. The network element in accordance with claim 6, further comprising a protection module configured to:
  detect a fault condition of the first synchronization control module configured in the first operating mode; and
  configure the second synchronization control module in the first operating mode in response to the fault detection to resume adjusting an offset of the second local clock.

8. The network element in accordance with claim 6, wherein the first synchronization control module is configured in the first operating mode and the second synchronization control module is configured in the second operating mode.

9. The network element in accordance with claim 8, further comprising an application interface for passing timestamps generated by the second local clock to an application configured to estimate an end-to-end latency experienced by a packet flow.

10. The network element in accordance with claim 1, wherein the synchronization messages are exchanged in accordance with an IETF Network Time Protocol or an IEEE Precision Time Protocol.

11. The network element in accordance with claim 10, further comprising an interface for receiving the configuration signal from a Grand Master clock in a PTPV2 management message.

12. The network element in accordance with claim 1, further comprising a physical layer module associated to a network port and configured to synchronize the local clock with a synchronous physical layer signal received at the network port.

13. The network element in accordance with claim 12, wherein the physical layer signal is generated in accordance with a Synchronous Ethernet standard.

14. A packet-switched network comprising:
  a network element comprising:
    a plurality of network ports for exchanging synchronization messages with further network elements;
    a local clock;
    a timestamp generation module associated to each network port for triggering generation of a timestamp by the local clock at the time of sending or receiving a synchronization message through the network port; and
    a first synchronization control module selectively configured in a first operating mode and a second operating mode as a function of a configuration signal;
    wherein when the first synchronization control module is configured in the first operating mode, it operates to select a first network port as a slave port and a second network port as a master port, adjust an offset of the local clock as a function of the timestamps of the synchronization messages received through the slave port and send synchronization messages including timestamps obtained with the adjusted local clock through the master port; and
    wherein when the first synchronization control module is configured in the second operating mode, it operates to forward the synchronization message received through the first network port to the second network port, send the synchronization message through the second network port and compute a residence time of the synchronization message in the network element as a function of the timestamps obtained at the times of receiving and sending the synchronization message;
  an intermediate node configured to operate as a boundary clock; and
  a source node configured to generate the synchronization message, the synchronization message comprising the configuration signal and a network address of the network element, and the source node being configured to transmit the signaling message through the intermediate node towards the network element;
  the intermediate node being configured to:
  terminate the synchronization message;
  detect the configuration signal; and
  repeat the configuration signal in a second synchronization message and transmit the second synchronization message to the network address of network element wherein the network element further comprises a detection module for detecting the configuration signal as a signaling object within the synchronization message and wherein the first synchronization control module processes the synchronization message in accordance with the first operating mode or the second operating mode as a function of the signaling object included in the synchronization message.

* * * * *